United States Patent
Stanners

(10) Patent No.: US 7,426,378 B2
(45) Date of Patent: *Sep. 16, 2008

(54) SEPARATION OF COCHANNEL FM SIGNALS

(75) Inventor: Steven P. Stanners, Rowlett, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 652 days.

This patent is subject to a terminal disclaimer.

(21) Appl. No.: 11/099,229

(22) Filed: Apr. 5, 2005

(65) Prior Publication Data

US 2006/0223479 A1 Oct. 5, 2006

(51) Int. Cl.
*H04B 1/10* (2006.01)

(52) U.S. Cl. ....................... 455/296; 455/303

(58) Field of Classification Search ................ None
See application file for complete search history.

(56) References Cited

U.S. PATENT DOCUMENTS

| | | | |
|---|---|---|---|
| 5,307,517 A | 4/1994 | Rich |
| 5,588,022 A | 12/1996 | Dapper et al. |
| 5,697,086 A | 12/1997 | Svoboda |
| 5,943,345 A | 8/1999 | Takegahara |
| 5,995,567 A | 11/1999 | Cioffi et al. |
| 6,005,894 A | 12/1999 | Kumar |
| 6,018,317 A | 1/2000 | Dogan et al. |
| 6,208,295 B1 | 3/2001 | Dogan et al. |
| 6,215,983 B1 | 4/2001 | Dogan et al. |
| 6,310,704 B1 | 10/2001 | Dogan et al. |
| 6,452,977 B1 | 9/2002 | Goldston et al. |
| 6,535,666 B1 | 3/2003 | Dogan et al. |
| 6,574,235 B1 | 6/2003 | Arlan et al. |
| 6,658,234 B1 | 12/2003 | Dogan et al. |
| 6,847,688 B1 | 1/2005 | Molnar et al. |
| 7,254,197 B2 * | 8/2007 | Heo et al. ............ 375/347 |
| 7,336,698 B2 * | 2/2008 | Nuutinen et al. ........ 455/296 |
| 2006/0046670 A1 | 3/2006 | Colling |
| 2007/0184799 A1 | 8/2007 | Colling |

FOREIGN PATENT DOCUMENTS

| | | |
|---|---|---|
| EP | 1032962 B1 | 6/2003 |
| WO | WO99/33141 | 7/1999 |

OTHER PUBLICATIONS

Ampsys, "Platinum II FM Demodulator", Printed From Internet Aug. 2004, 2 pgs.
Ampsys, "Platinum III FM Demodulator", Printed From Internet Aug. 2004, 2 pgs.
Ampsys, "Platinum II & III FM Demodulator", Printed From Internet Aug. 13, 2004, www.ampsys-eletronics.com/products/indexoffers.php, 1 pg.

(Continued)

*Primary Examiner*—Thanh C Le
(74) *Attorney, Agent, or Firm*—O'Keefe, Egan, Peterman & Enders, LLP

(57) ABSTRACT

Multiple cochannel FM signals received, for example, in an overloaded signal environment may be separated using parallel interference cancellation techniques.

31 Claims, 8 Drawing Sheets

OTHER PUBLICATIONS

Ampsys, "FM Modulation", Printed From Internet Aug. 13, 2004, www.ampsys-electronics.com/technology/indexfmdemodulation.php, 2 pgs.

Ampsys, "Technology Pack", Printed From Internet Aug. 16, 2004, www.ampsys-electronics.com/tech-transfer/indexopportunities.php, 1 pg.

Ampsys, "FM Multipath Interference", Printed From Internet Aug. 13, 2004, www.ampsys-electronics.com/technology/indexmultipath.php, 1 pg.

Ampsys, "FM Co-Channel Interference", Printed From Internet Aug. 13, 2004, www.ampsys-electronics.com/technology/indexcochannel, 1 pg.

Ampsys, "Standard FM Demodulators", Printed From Internet Aug. 13, 2004, www.ampsys-electronics.com/technology/indexstandard, 1 pg.

Ampsys, "Platinum FM Demodulator", Printed From Internet Aug. 13, 2004, www.ampsys-electronics.com/technology/indexplatinum.php, 2 pgs.

Ampsys, "Platinum II & III FM Technology Pack", Printed From Internet Aug. 13, 2004, www.ampsys-electronics.com, 1 pg.

Ampsys, "The Platinum III FM Technology Pack", Printed From Internet Aug. 13, 2004, www.ampsys-elecctronics.com/products/platinum-III.php, 3 pgs.

Ampsys, "The Platinum III FM Demodulator Evaluation Unit", Printed From Internet Aug. 13, 2004, www.ampsys-elecctronics.com/products/platinum-III-features.php, 1 pg.

Ampsys, "Technology Pack", Printed From Internet Aug. 13, 2004, www.ampsys-electronics.com/indexhome.php, 1 pg.

Ampsys, "Company Background", Printed From Internet Aug. 13, 2004, www.ampsys-electronics.com/home/indexabout.php, 1 pg.

Ampsys, "The Platinum II FM Technology Pack", Printed From Internet Aug. 13, 2004, www.ampsys-elecctronics.com/products/platinum-II.php, 2 pgs.

Ampsys, "Team" Printed from Internet Aug. 16, 2004, www.ampsys-electronics.com/home/indexteam.php, 1 pg.

Ampsys, "The Platinum II FM Demodulator Evaluation Unit", Printed From Internet Aug. 13, 2004, www.ampsys-electonics.com/products/platinum-II-features.php, 1 pg.

Widrow et al., "Adaptive Noise Cancelling: Principles And Applications", Proceedings of The IEEE, vol. 63, No. 12, Dec. 1975, pp. 1692-1716.

Verdu, "Multiuser Detectors", Chapter 7, Cambridge University Press, New York, 1998, pp. 344-363.

Trussell, "The Feasible Solution In Signal Restoration", *IEEE Transactions On Acoustics, Speech, And Signal Processing*, vol. ASSP-32, No. 2, Apr. 1984, pp. 201-212.

* cited by examiner

SEPARATION OF COCHANNEL FM SIGNALS

BACKGROUND OF THE INVENTION

1. Field of the Invention

This invention relates generally to radio frequency (RF) signal reception, and more particularly to reception and separation of cochannel frequency modulated (FM) signals.

2. Description of the Related Art

Cochannel signal interference occurs when two or more signals are received at the same time over the same frequency range or band. For example, cochannel signal interference may be encountered by a receiver that is receiving two or more signals transmitted at the same frequency and at the same time by two or more separate transmitters. In such a case, data (e.g., voice data, text data, etc.) contained in any one of the interfering cochannel signals cannot be accessed or processed further without first separating the given signal from the other signals to allow demodulation or other further signal processing. This situation occurs frequently with airborne receivers. Even signals with carefully planned frequency re-use (such as FM radio stations), often result in co-channel interference for airborne receivers due to the much longer line-of-sight. In the case of analog FM, cochannel signal interference can result in the inability of a conventional FM receiver to copy one or more signals, typically the weaker signal/s.

In the past, beamforming and interference cancellation techniques such as spatial interference cancellation have been employed for purposes of cochannel signal separation. These techniques employ multiple sensors to separate a given signal of interest by canceling or nulling out other cochannel signals from the signal of interest. For example, in the case of beamforming, multiple spatially separated antennas connected to multiple phase-coherent receivers or multi-channel coherent tuner are used. The signals from the spatially separated antennas are combined in such a way as to emphasize the contribution of one signal over the others, allowing the use of a conventional (single-signal) demodulator at the beamformer output. This technique makes use of spatial structure.

However, such past approaches require spatial separation of sources in addition to expensive coherent multi-channel tuners having a number of channels corresponding to a number of sensors that is equal to or greater than the number of cochannel signals. When the number of signals exceeds the number of sensors, the signal environment may be characterized as overloaded. Performance of traditional beamforming and interference cancellation techniques typically fails or degrades in such an overloaded signal environment.

Parallel Interference Cancellation ("PIC") and Serial Interference Cancellation ("SIC") are types of algorithms typically used for jointly estimating data bits for multi-user spread-spectrum CDMA signals. In such an application, there are usually a large number of co-channel signals, and even though the signal is designed with co-channel operation in mind, advanced techniques are sometimes used to provide better performance. These techniques are referred to as Multi-User Detection ("MUD") algorithms. PIC is one of the most popular types of MUD algorithms, due to its ability to cope with the long code problem, which refers to situations where the spreading code spans more than a single data symbol.

SUMMARY OF THE INVENTION

Disclosed herein are methods and systems that may be implemented to separate cochannel analog frequency modulated ("FM") signals, and in one embodiment, in an overloaded signal environment, i.e., a signal environment where the number of cochannel signals exceeds a number of separate sensors (e.g., separate antennas). Advantageously, the disclosed methods and systems may be implemented in one exemplary embodiment to achieve separation of cochannel FM signals present in an overloaded environment using data obtained from a single channel tuner by employing a parallel interference cancellation ("PIC") algorithm that is implemented digitally using digital signal processing. The disclosed methods and systems may be implemented to advantageously eliminate the need for multi-channel coherent hardware and the constraint of spatially separated multiple sources. Digital implementation of the algorithms of the disclosed systems and methods make them flexible and allow them to be tailored to focus on particular FM signal bandwidths and modulation indexes to fit the characteristics of particular FM cochannel environments (e.g., commercial broadcast FM bandwidths, etc.).

In one embodiment disclosed herein, PIC may be based on successive approximation and may be implemented as a non-linear, iterative transformation which performs a task similar to a beamformer, but with only a single channel of data. This means that PIC may be advantageously implemented to function with less data than a beamformer, which produces outputs by creating linear combinations of spatially separated sensors. For example, the disclosed systems and methods may be implemented in one embodiment using a single channel parallel interference cancellation algorithm that requires only a single channel of data, e.g., from a single antenna. The algorithm may implemented using digital signal processing to separate cochannel FM signals by exploiting detailed knowledge of the signal structure, including modulation type and message bandwidth.

Using the disclosed parallel interference cancellation algorithm, the disclosed systems and methods may be implemented to allow separation of co-channel signals without the need for antenna arrays, or the cost or size, weight and power ("SWAP") of coherent digital tuners. Furthermore, the disclosed methods and systems of single-channel interference cancellation may be advantageously employed to separate FM signals with poor geometry, e.g., even co-located FM signal communications may be separated. This is in contrast to traditional beamforming, which requires a certain degree of spatial separation between signals to function. In one exemplary embodiment, the disclosed methods and systems may be implemented in an environment in which all the signals present in the environment adhere to the same model, meaning that all the signals share the same modulation type, i.e., are all FM signals. In another exemplary embodiment, the disclosed methods and systems may be implemented in an environment in which the modulation technique by which each signal was created is known.

In one embodiment, the disclosed methods and systems may be implemented to improve reliability and performance of an FM receiver system by enabling cochannel signal separation even when the number of FM cochannel signals exceeds the number of sensors or antenna elements. In one example, the disclosed methods and systems may be implemented to provide improved FM demodulators for consumer electronics. In another embodiment, the disclosed methods and systems may be implemented to reduce the cost, complexity and/or size of an FM receiver system by reducing the number of sensors and corresponding separate tuner channels that are required to separate cochannel FM signals. In yet another embodiment, the disclosed methods and systems may be implemented to improve bandwidth utilization for broadcast FM signals, and potentially allowing simplification or elimination of the government approval process for establishing new FM broadcast channels. For example, more efficient use of the FM frequency band may be achieved by allowing selection and separation of one or more target FM signals from a number of cochannel FM signals that are intentionally transmitted on the same frequency.

As an example, in one exemplary embodiment, the disclosed methods and systems may be implemented as a receiver system that is capable of separating or isolating at least one FM signal from two or more transmitted cochannel FM signals using a single sensor (e.g. single antenna) coupled to a corresponding single channel tuner. Such a single-sensor implementation may be utilized to achieve cost savings and reduced receiver system size, facilitating installation of such a receiver system on mobile platforms (e.g., ships, aircraft, automobiles, trains, unmanned aerial vehicles, model aircraft, etc.), where implementation of larger and more costly multi-sensor antenna receiver systems are impractical or impossible.

The disclosed methods and systems may be advantageously implemented in one embodiment to selectively isolate (e.g., for purpose of listening, further processing, etc.) one or more desired cochannel FM signals from the cochannel FM signals that have been separated from an overloaded signal environment that is unintentionally or undesirably created, e.g., such as when a permanent or mobile receiver is geographically positioned between two transmitters that are transmitting FM signals over the same frequency at the same time. One example of such a situation is an airborne vehicle-based receiver that is located between two cities having transmitters that are simultaneously broadcasting FM signals at the same frequency.

However the disclosed methods and systems may also be implemented in another embodiment to enable selective isolation of one or more FM signals that have been separated from an intentionally or deliberately created overloaded signal environment. Examples of types of similar overloaded amplitude modulated ("AM") signal environments may be found described in U.S. patent application Ser. No. 10/930,732, filed Aug. 31, 2004, and which is incorporated herein by reference. For example, two or more FM signals may be intentionally transmitted at the same time over the same selected frequency range in manner to more efficiently utilize the selected frequency range. In such an embodiment, the cochannel FM signals may originate or be transmitted in any manner suitable for creating an overloaded signal environment from which the FM cochannel signals may be separated and at least one of the FM cochannel signals may be isolated using the disclosed methods and systems. For example, the cochannel FM signals may originate or be transmitted from geographically remote locations (e.g., by transmitters and antennas located in separate adjacent cities, by transmitters and antennas located in different geographical areas of the same city, etc.), and/or the cochannel FM signals may originate or be transmitted from a common geographic location (e.g., by transmitters and antennas located at the same radio station or other facility).

In one exemplary embodiment, multiple commercial FM radio signals may be intentionally transmitted over the same selected frequency range. In another exemplary embodiment, FM radio signals that contain public service information (e.g., weather-related information, highway-related information, emergency broadcast system "EBS" information, etc.) may be intentionally broadcast either continuously or on an as-needed basis over the same selected frequency range used by, or that may be used by, other transmitter/s of FM signals (e.g., commercial FM radio transmitters). For example, the disclosed methods and systems may be implemented to allow intermittent public service broadcasts (e.g., upon occurrence of a catastrophic event such as plane crash, earthquake, tornado, hurricane, etc.) to be transmitted over one or more FM frequencies (e.g., over a selected number of multiple FM frequencies) that may be shared by local commercial FM radio stations. In such an embodiment, a receiver may be configured according to the disclosed methods and systems to isolate the public service broadcast from other cochannel FM signals.

Whether an overloaded signal environment is intentional or not, the disclosed methods and systems may be implemented in one embodiment in specialized public service radios that are designed to isolate a public service FM broadcast signal from an overloaded signal environment if it should happen to exist at time of the public service transmission (e.g., to help ensure that the public service transmission is received even under adverse cochannel signal conditions). In another embodiment the disclosed methods and systems may be implemented as part of a commercial FM radio receiver that is configured to receive commercial radio broadcasts under normal operating conditions, but that is also configured to isolate and identify intermittent public service broadcast signals when they occur in an overloaded signal environment. Such a receiver may be optionally configured to preferentially play the public service broadcast to a listener. In any case, a signal environment may be overloaded prior to the public service transmission, or may be created by virtue of the transmission of the public service transmission simultaneous to other FM signals on the same frequency (intentionally or unintentionally).

In any case, selective isolation of a given cochannel FM signal from other cochannel FM signals that have been received and separated from RF data received in an overloaded signal environment may be performed in response to a command specifying the identity of the given one of the cochannel FM signals. Such a command may originate, for example, from any source suitable for selectably choosing a given cochannel FM signal for isolation, e.g., a human user choosing a desired cochannel broadcast for listening, a computer processor choosing a selected cochannel broadcast needed for performing a specific task at hand, etc.

In one respect, disclosed herein is a method for processing FM signals, including: receiving RF data, the received RF data including cochannel FM signals received in the same frequency range and at the same time; using parallel interference cancellation to provide an estimate for each of the cochannel FM signals; and separating each of the cochannel FM signals from other cochannel FM signals of the received RF data based on the estimate for each of the cochannel FM signals.

In another respect, disclosed herein is a method for transmitting FM signals, including providing RF data including cochannel FM signals for transmission in the same frequency range and at the same time for reception by a receiver, the receiver configured to separate each of the cochannel FM signals from other cochannel FM signals of the RF data based on an estimate for each of the cochannel FM signals provided by parallel interference cancellation.

In another respect, disclosed herein is a system for communication, the system including: transmit circuitry configured to provide RF data including cochannel FM signals for transmission in the same frequency range and at the same time; and receive and separation circuitry configured to receive and separate each of the cochannel FM signals from other cochannel FM signals of the RF data by using parallel interference cancellation to provide an estimate for each of the cochannel FM signals, and separating each of the cochannel FM signals from other cochannel FM signals of the received RF data based on the estimate for each of the cochannel FM signals.

In another respect, disclosed herein is an FM signal processing system, including: receive and separation circuitry coupled to receive RF data, the received RF data including cochannel FM signals received in the same frequency range and at the same time; and wherein the receive and separation circuitry is configured to use parallel interference cancellation to provide an estimate for each of the cochannel FM signals, and to separate each of the cochannel FM signals from other cochannel FM signals of the received RF data based on the estimate for each of the cochannel FM signals.

DESCRIPTION OF ILLUSTRATIVE EMBODIMENTS

Using the disclosed methods and systems, cochannel FM signals may be separated from each other using parallel interference cancellation techniques. In one embodiment, the cochannel FM signals may be characterized as transmitted FM signals having a known temporal structure in the transmitted signals. The disclosed methods and systems may be implemented, for example, as part of a receiver or transceiver in any manner suitable for achieving the cochannel signal separation results described elsewhere herein.

Figure 1A:
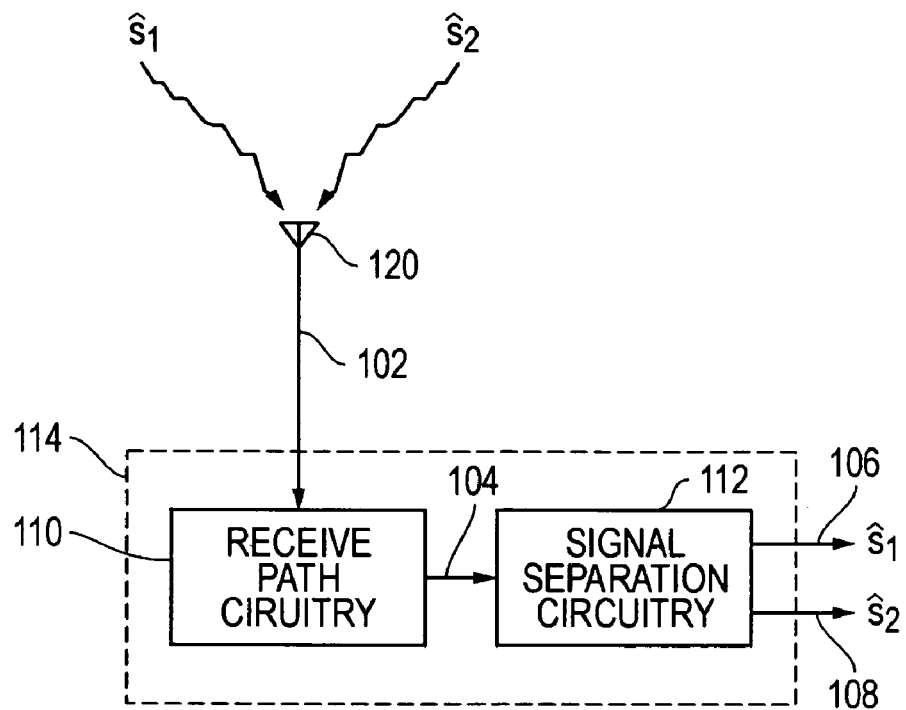
FIG. 1A is a block diagram of a system as it may be implemented according to one exemplary embodiment of the disclosed methods and systems.

FIG. 1A illustrates one exemplary embodiment of a system 100 as it may be implemented to receive and to separate cochannel FM signals $\hat{s}_1$ and $\hat{s}_2$ in an overloaded signal environment. In the illustrated embodiment signal $\hat{s}_1$ is a stronger signal relative to signal $\hat{s}_2$. As illustrated in FIG. 1A, system 100 includes a single sensor in the form of single antenna 120 that is coupled to receive and separation circuitry 114 that, in this exemplary embodiment, includes receive path circuitry 110 coupled to signal separation circuitry 112, it being understood that any other configuration of receive and separation circuitry may be employed that is suitable for performing one or more of the signal separation tasks described elsewhere herein.

System 100 is illustrated configured as a receive-only system in FIG. 1A. However, it will be understood that in other embodiments the disclosed methods and systems may be alternatively implemented in a system configured as a transceiver. In addition, it is possible that more than one antenna 120 may be coupled to receive and separation circuitry 114, and/or that antenna 120 may be a single element antenna or an antenna array. It will also be understood that in other embodiments an overloaded signal environment may include more than two cochannel signals.

As illustrated in FIG. 1A, antenna 120 is coupled to provide a RF data 102 that contains a combination of multiple received FM signals $\hat{s}_1$ and $\hat{s}_2$ to receive path circuitry 110. Receive path circuitry 110 (e.g., single channel tuner or other suitable circuitry) is configured to process or condition the received RF data 102 from antenna 120 so as to provide received data signal 104 (e.g., as a single tuned channel), that contains combined multiple signals $\hat{s}_1$ and $\hat{s}_2$, to signal separation circuitry 112 (e.g., implemented as part of a digital signal processor or with other suitable circuitry). Signal separation circuitry 112 is configured to receive received data signal 104 from receive path circuitry 110 and to separate multiple signals $\hat{s}_1$ and $\hat{s}_2$. As shown, signal separation circuitry 112 is configured to provide multiple differentiated signals $\hat{s}_1$ and $\hat{s}_2$ (e.g., as respective separate signals 106 and/or 108) to other receiver system components not shown (e.g., components/circuitry for further processing, FM demodulation, etc.). It will be understood that separate signals 106 and 108 may be provided simultaneously by signal separation circuitry 112, or that only one of differentiated signals 106 or 108 may be preferentially or selectably provided by signal separation circuitry 112.

In the practice of the disclosed methods and systems signal separation circuitry, such as circuitry 112 of FIG. 1A, may be implemented using any circuit configuration or combination of circuit configurations suitable for separating two or more combined cochannel FM signals, e.g., received from one or more sensor/s deployed in an overloaded signal environment. For example, in one embodiment signal separation circuitry may be configured in any manner suitable for achieving separation of cochannel FM signals in an overloaded environment using data obtained from one or more sensors using the disclosed parallel interference cancellation techniques, e.g., using methodology such as described in relation to FIGS. 2-5 herein. In one embodiment, signal separation circuitry 112 of FIG. 1A may be implemented as a digital-signal processor (DSP). Alternatively, or in addition to a DSP, signal separation circuitry 112 may be implemented using any other type/s of suitable signal processor/s.

It will be understood that the illustrated embodiment of FIG. 1A is exemplary only, and that any other configuration of circuitry and/or sensor/s suitable for accomplishing signal separation according to the methodology disclosed herein is possible. It will also be understood that although FIG. 1A illustrates separation of two cochannel FM signals from an overloaded signal environment, the disclosed methods and systems may be implemented in overloaded signal environments that include three or more cochannel FM signals. In FIG. 1A, signal separation circuitry 112 is shown configured to separate cochannel FM signals $\hat{s}_1$ and $\hat{s}_2$ and to provide these as separate output signals 106 and 108. However, it will be understood that signal separation circuitry may be configured in other embodiments to separate out only one cochannel FM signal received from an overloaded signal environment including two or more cochannel signals, e.g., to separate only FM signal $\hat{s}_1$ or signal $\hat{s}_2$ from the overloaded signal environment of FIG. 1A. In this regard, an overloaded signal environment may include any given total number of cochannel FM signals, and the disclosed methods and systems may be implemented in one embodiment to separate out any number of the cochannel FM signals that is equal to or less than the total number of cochannel FM signals, as may be desired or required to meet the needs of a given application. In one exemplary embodiment, the given total number of cochannel FM signals may be characterized as a number of cochannel FM signals having a received signal strength greater than a given signal strength threshold.

Figure 1B:
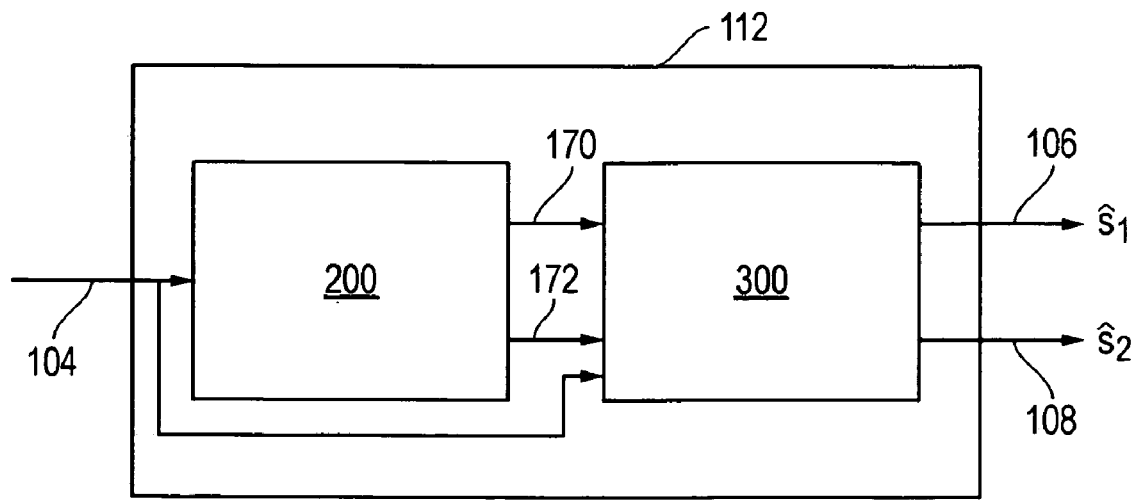
FIG. 1B is a block diagram of a signal separation circuitry as it may be implemented according to one exemplary embodiment of the disclosed methods and systems.

FIG. 1B is a block diagram showing one exemplary embodiment of signal separation circuitry 112 as it may be implemented with initial signal estimation circuitry 200 provided between received data signal 104 and parallel interference cancellation ("PIC") circuitry 300. Features of signal separation circuitry 112 may be implemented using any hardware and/or software configuration suitable for performing the tasks described elsewhere herein. For example, one or more algorithms (e.g., PIC algorithm) of the disclosed systems and methods may be implemented using general purpose processors, specialized Digital Signal Processing (DSP) processors, Application Specific Integrated Circuits (ASICs), Field Programmable Gate Arrays (FPGAs), Programmable Logic Devices (PLDs), combinations thereof, etc.

As shown in FIG. 1B, initial signal estimation circuitry 200 may be present to receive received data signal 104 that includes combined FM signals $\hat{s}_1$ and $\hat{s}_2$, and to provide an initial estimate of signals $\hat{s}_1$ and $\hat{s}_2$ as respective signals 170 and 172 to PIC circuitry 300 for further estimation in a manner as will be described further herein. As further illustrated, received data signal 104 may also be provided to PIC circuitry 300. PIC circuitry 300 may, in turn, provide improved estimates 106 and 108 for each of signals $\hat{s}_1$ and $\hat{s}_2$ based at least in part on signals 170 and 172 and received data signal 104. By an improved estimate of a given signal, it is meant that the most recent estimate of the signal more closely approximates the true value of the signal than a previous estimate of the signal.

It will be understood that FIGS. 1A and 1B are exemplary only and that signal separation circuitry 112 may be configured in other embodiments to estimate greater than two combined FM signals that may be present in an input signal such as received data signal 104 received from receive path circuitry 110 or from other suitable source. In the practice of the disclosed methods and systems, initial signal estimation circuitry may be any circuitry suitable for receiving a data signal that includes two or more combined FM signals, and for providing an initial estimate of each of the two or more combined signals (e.g., as respective signals 170 and 172) to coupled PIC circuitry. Examples of such circuitry include, but are not limited to, Serial Interference Cancellation ("SIC") circuitry, etc.

Figure 2:
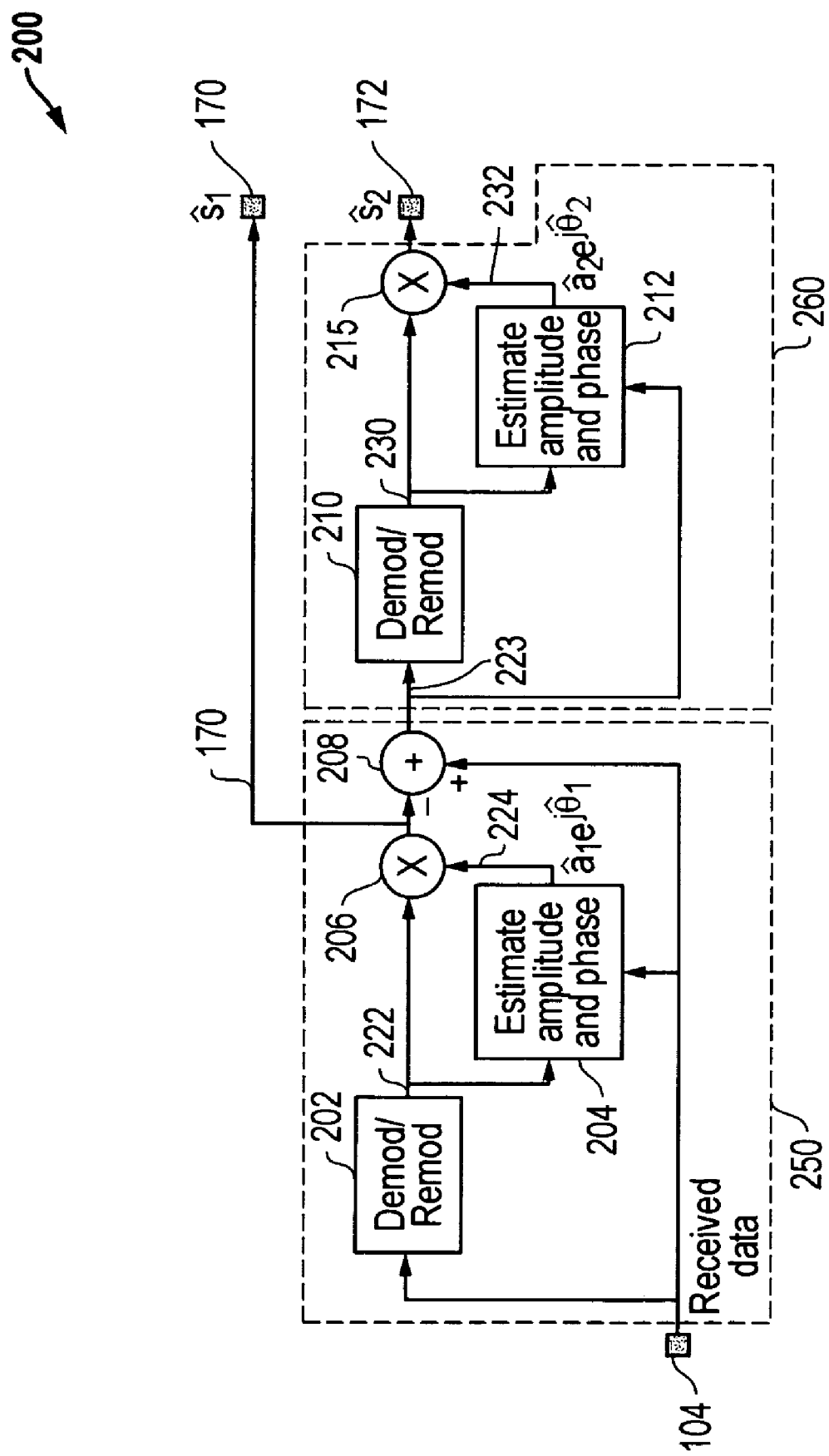
FIG. 2 is a block diagram of serial interference cancellation circuitry according to one exemplary embodiment of the disclosed methods and systems.

FIG. 2 is a block diagram illustrating Serial Interference Cancellation ("SIC") circuitry that may be implemented in one exemplary embodiment as initial signal estimation circuitry 200 of signal separation circuitry 112 of FIG. 1B. In this exemplary embodiment, SIC circuitry 200 is shown configured to receive single received data signal 104 that includes combined multiple FM signals $\hat{s}_1$ and $\hat{s}_2$ from receive path circuitry 110. However, it will be understood that circuitry 200 may receive a single signal that includes combined multiple FM signals from any other suitable signal source. Furthermore, it will be understood that in other embodiments initial signal estimation circuitry 200 need not be configured as SIC circuitry, but instead may be configured in any other manner suitable for providing initial estimates of FM signals $\hat{s}_1$ and $\hat{s}_2$ to PIC circuitry 300. Alternatively, it is possible that circuitry 200 may be absent from circuitry 112, i.e., circuitry 112 may be implemented only with parallel interference cancellation ("PIC") circuitry 300.

As shown in FIG. 2, SIC circuitry 200 includes a first SIC stage 250 that is coupled in series to a second SIC stage 260. First SIC stage 250 includes single signal demodulator circuitry 202 that is configured to receive input signal 104, to estimate the strongest signal $\hat{s}_1$ present in signal 104, and to output this estimate as signal 222. First SIC stage 250 also includes phase and amplitude estimation circuitry 204 that is configured to receive input signal 104 and to receive signal 222 from single signal demodulator circuitry 202. Phase and amplitude estimation circuitry 204 is configured to estimate phase and amplitude of transmitted signal $\hat{s}_1$ and to output this phase and amplitude estimate as a remodulated signal 224 that is multiplied with signal 222 in mixer circuitry 206 to provide estimated strongest signal $\hat{s}_1$ as signal 170. In this regard, phase and amplitude estimation circuitry 204 may be implemented using any algorithm or methodology suitable for estimating phase and amplitude of transmitted signal $\hat{s}_1$ including, for example, least squares, recursive least squares, etc.

Still referring to FIG. 2, estimated strongest signal $\hat{s}_1$ is combined as signal 170 with input signal 104 in summer 208 in a manner so as to cancel estimated strongest signal $\hat{s}_1$ from the received data of input signal 200, resulting in first residual signal 223 that is next fed to second stage 260 of circuitry 200. As illustrated, second SIC stage 260 includes single signal demodulator circuitry 210 that is configured to receive first residual signal 223, to estimate the next strongest signal $\hat{s}_2$ present in signal 223, and to output this estimate as signal 230. Second SIC stage 260 also includes phase and amplitude estimation circuitry 212 that is configured to receive first residual signal 223 and to receive signal 230 from single signal demodulator circuitry 210. In a manner similar to phase and amplitude estimation circuitry 204, phase and amplitude estimation circuitry 212 is configured to estimate phase and amplitude of transmitted signal $\hat{s}_2$ and to output this estimate as a remodulated signal 232 that is mixed with signal 230 in mixer circuitry 215 to provide estimated next strongest signal $\hat{s}_2$ as signal 172.

Although not illustrated for the embodiment of FIG. 2, it will be understood that SIC circuitry may be configured in other embodiments for estimating greater than two signals. For example, referring to FIG. 2, estimated next strongest signal 172 that is output from mixer 215 may be combined with first residual signal 223 in a manner so as to cancel second strongest signal 172 from first residual signal 223 (e.g., using a summer similar to summer 208 of first SIC stage 250), creating a second residual signal in which signals $\hat{s}_1$ and $\hat{s}_2$ have been cancelled. Such a second residual signal may be fed to a third SIC stage (not shown in FIG. 2) that is configured similar to first and second SIC stages 250 and 260 for estimation of a third strongest signal $\hat{s}_3$ (also not shown). Such a methodology may be repeated in additional stages as necessary for additional signals, i.e., as many SIC stages may be serially coupled as is needed to estimate a given number of combined FM signals present in received data of an input signal to the SIC circuitry.

Figure 3:
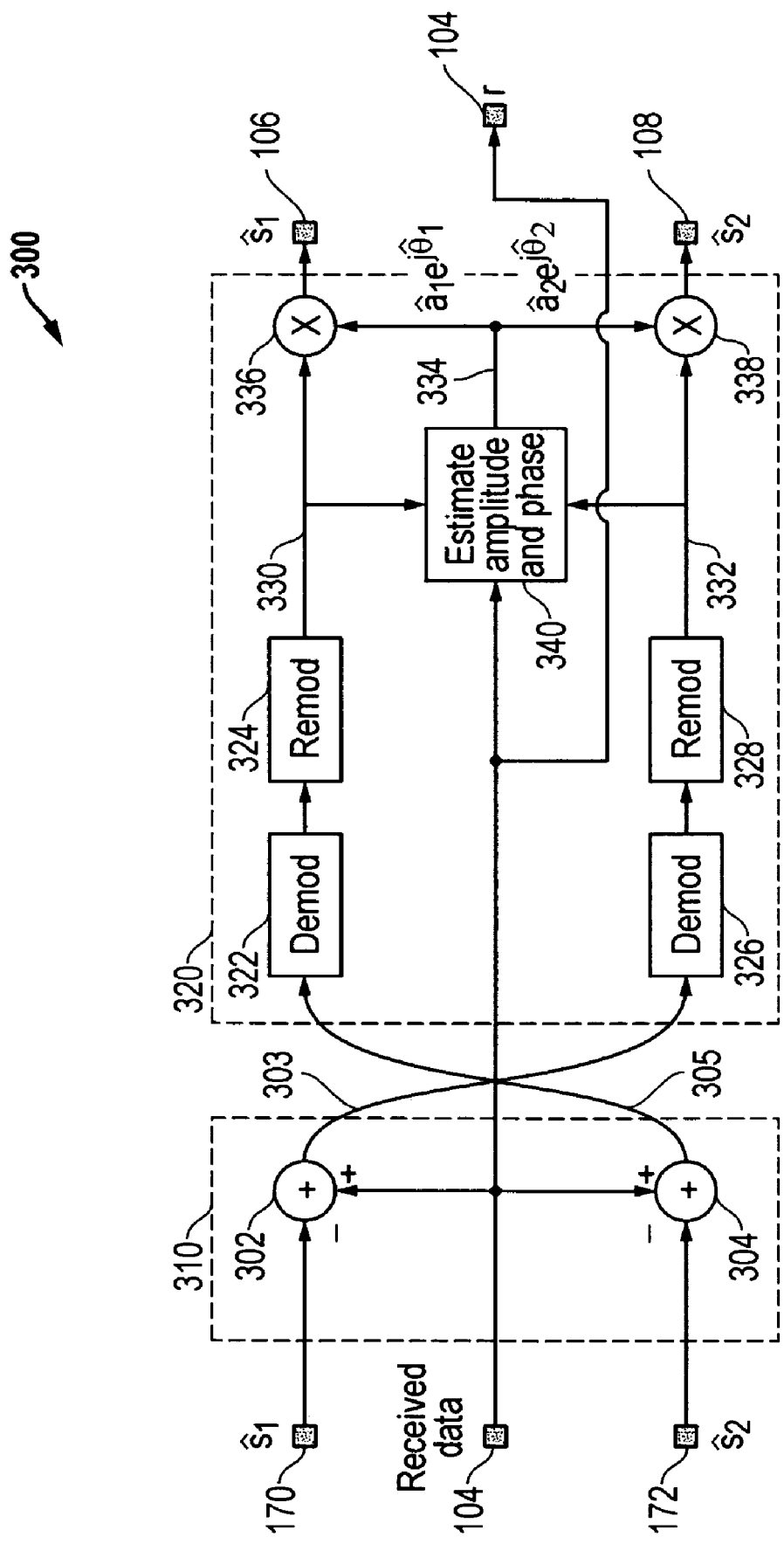
FIG. 3 is a block diagram of parallel interference cancellation circuitry according to one exemplary embodiment of the disclosed methods and systems.

FIG. 3 illustrates one embodiment of parallel interference cancellation ("PIC") circuitry 300 that may be configured in one exemplary embodiment to operate in block mode as part of signal separation circuitry 112. In the illustrated embodiment, PIC circuitry 300 is configured to further refine estimates of each signal $\hat{s}_1$ and $\hat{s}_2$ by estimating each signal independently, in each of multiple stages. In this regard, parallel interference cancellation ("PIC") circuitry 300 of FIG. 3 may be configured to estimate each signal on a data block by data block basis, i.e., to estimate signal $\hat{s}_1$ and $\hat{s}_2$ for each separate data block in a non-streaming manner.

Although SIC circuitry 200 may be implemented in one embodiment to provide initial estimates of signals $\hat{s}_1$ and $\hat{s}_2$ for further processing and refinement by PIC circuitry 300, PIC circuitry 300 may be implemented to advantageously improve estimates of signals $\hat{s}_1$ and $\hat{s}_2$ over the results of SIC circuitry 200 alone. In this regard, PIC circuitry 300 may be implemented to provide superior results to multi-stage SIC circuitry configurations as they may be implemented for signal separation alone. Success of later SIC stages depends on the ability to accurately cancel signals from previous stages, meaning that SIC estimation errors tend to accumulate quickly. Since accurate SIC signal cancellation requires substantially accurate estimation of signal amplitudes and phases, any SIC estimation errors tend to lead to a breakdown of later SIC stages, even though these parameters are usually not needed for demodulation. Furthermore, it is typically desirable that the single-signal demodulator of SIC circuitry be able to function in the presence of interference, and to provide a good estimate of the strongest signal present, e.g., similar to the capture effect of a conventional FM receiver. When two or more signals have nearly equal power levels, performance of a single-signal demodulator of SIC circuitry may degrade.

FIG. 3 illustrates a single layer or stage of PIC circuitry 300 that may be configured to operate in block mode for operation in a two-signal case. In this regard, PIC circuitry 300 may be configured to receive estimated FM signals $\hat{s}_1$ and $\hat{s}_2$ as signals 170 and 172, respectively, from initial signal estimation circuitry 200 (e.g., which may be SIC circuitry in one embodiment). Although PIC circuitry 300 of FIG. 3 is shown coupled to receive estimated FM signals $\hat{s}_1$ and $\hat{s}_2$ as signals 170 and 172, it will be understood that PIC circuitry 300 may alternatively be configured as an intermediate or final stage of multiple stage PIC circuitry, in which case PIC circuitry 300 may be coupled to receive estimated FM signals $\hat{s}_1$ and $\hat{s}_2$ as signals 106 and 108 from a previous stage of PIC circuitry as will be described further herein in relation to FIG. 4.

As shown in FIG. 3, PIC circuitry stage 300 includes an interference cancellation circuit block 310 in which previously estimated signals $\hat{s}_1$ and $\hat{s}_2$ are each subtracted or at least partially cancelled from received data signal 104 in summers 302 and 304 to produce weighted signals 303 and 305, respectively, that are each weighted toward the remaining (non-subtracted) signal, i.e., signal 303 is weighted toward signal $\hat{s}_2$ and signal 305 is weighted toward signal $\hat{s}_1$.

Still referring to FIG. 3, each of signals 303 and 305 are then provided to a respective single signal estimation path of signal estimation circuit block 320. As described below, weighted signal 305 is used by signal estimation circuit block 320 to produce a new estimate of signal $\hat{s}_1$, and signal 303 is used by signal estimation circuit block 320 to produce a new estimate of $\hat{s}_2$.

Each single signal estimation path of signal estimation circuit block 320 includes a single signal demodulator 322 or 326, and a single signal remodulator 324 or 328. Single signal demodulator 322 and remodulator 324 are configured to receive signal 305, to estimate the strongest signal $\hat{s}_1$ present in signal 305, and to output this estimate as signal 330. Single signal demodulator 326 and remodulator 328 are configured to receive signal 303, to estimate the strongest signal $\hat{s}_2$ present in signal 303, and to output this estimate as signal 332.

As shown in FIG. 3, signal estimation circuit block 320 also includes phase and amplitude estimation circuitry 340 that is configured to receive each of received data signal 104, signal 330 and signal 332. Phase and amplitude estimation circuitry 340 is configured to estimate phase and amplitude of signals $\hat{s}_1$ and $\hat{s}_2$, and to output this estimate of phase and amplitude as a remodulated signal 334. As shown, remodulated signal 334 is multiplied with signal 330 in mixer circuitry 336 to provide estimated signal $\hat{s}_1$ as signal 106 (having corrected phase and amplitude), and remodulated signal 334 is multiplied with signal 332 in mixer circuitry 338 to provide estimated signal $\hat{s}_2$ as signal 108 (having corrected phase and amplitude). Each of signals 106 and 108 represent improved estimated signals $\hat{s}_1$ and $\hat{s}_2$ that are corrected for phase and amplitude, and in one embodiment, suitable for use by the next PIC cancellation stage (where present). In this regard, phase and amplitude estimation circuitry 340 may be implemented using any algorithm or methodology suitable for estimating phase and amplitude of transmitted signals $\hat{s}_1$ and $\hat{s}_2$ including, for example, least squares, block least squares, etc.

Although FIG. 3 illustrates one exemplary embodiment of PIC circuitry 300 having interference cancellation circuit block 310 and a signal estimation circuit block 320 including single signal demodulators 322 and 326, single signal remodulators 324 and 328, phase and amplitude estimation circuitry 340 and mixer circuitry 336 and 338, it will be understood that any other circuit configuration suitable for estimating or further refining estimates of multiple cochannel signals (e.g., signals $\hat{s}_1$ and $\hat{s}_2$) by estimating each signal independently on a data block by data block basis may be employed. In this regard, signal estimation circuit block 320 may be any circuit configuration suitable for producing two or more processed signals that are each weighted toward one of the cochannel signals (e.g., signal $\hat{s}_1$ or $\hat{s}_2$) present in received data, then estimating the strongest signal (e.g., signal $\hat{s}_1$ or $\hat{s}_2$) present in each of the two or more processed signals, and then correcting the phase and amplitude of each of the strongest signals (e.g., signal $\hat{s}_1$ and $\hat{s}_2$) to produce an improved estimate of each of the cochannel signals (e.g., signal $\hat{s}_1$ and $\hat{s}_2$).

As previously described, PIC circuitry may be implemented to improve FM signal estimates over those made by SIC circuitry or other initial estimation circuitry. In one exemplary embodiment PIC circuitry may be implemented to estimate each cochannel FM signal independently, in multiple stages that are coupled back-to-back and following initial estimation circuitry (e.g., a serial initialization step) which provides initial signal estimates for the PIC circuitry. As so configured, the input to a signal estimation circuit block of a given PIC stage may be created by subtracting all the other signal estimates received from the previous stage from the received data signal.

Figure 4:
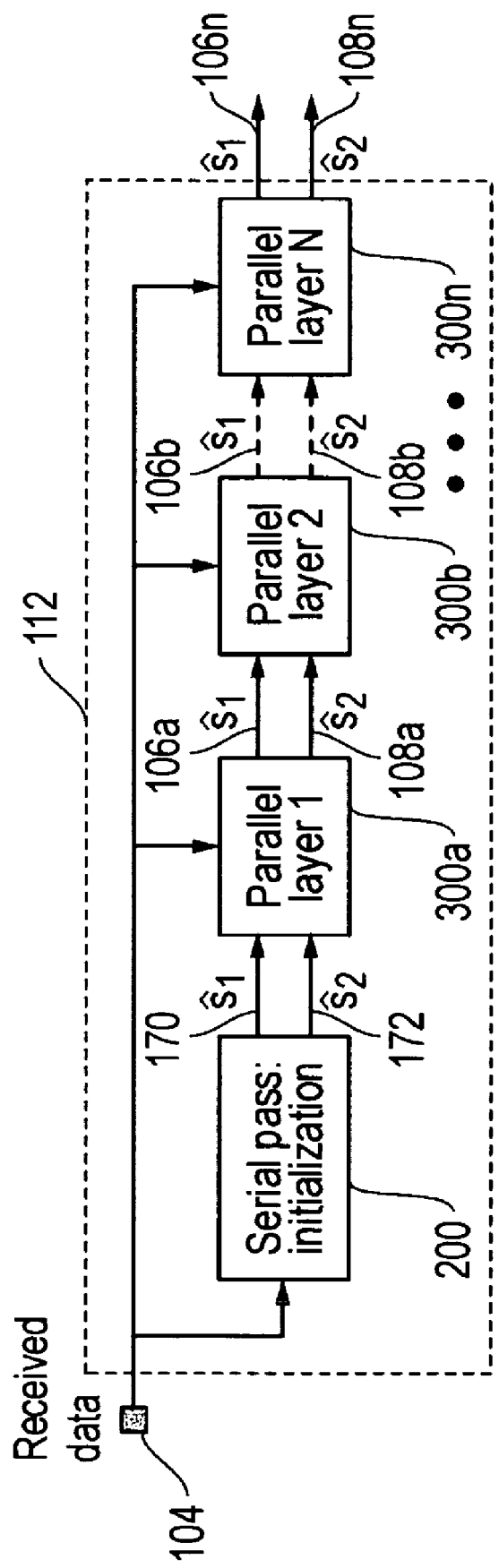
FIG. 4 is a block diagram of signal separation circuitry according to one exemplary embodiment of the disclosed methods and systems.

FIG. 4 shows one exemplary embodiment of signal separation circuitry 112 that includes initial signal estimation circuitry 200 in the form of SIC circuitry, and that has multiple PIC stages 300a through 300n which correspond to parallel layers 1 through N of PIC circuitry. Each of PIC stages 300a through 300n may be configured as a separate stage of PIC circuitry 300, e.g., as illustrated and described in relation to FIG. 3 above. As illustrated, signal separation circuitry 112 is coupled to receive received data signal 104 and to provide initial estimate of signals $\hat{s}_1$ and $\hat{s}_2$ as respective signals 170 and 172 to first PIC circuitry stage 300a, e.g., in a manner as illustrated and described in relation to FIG. 2 above. First PIC circuitry stage 300a is coupled to receive received data signal 104 and respective signals 170 and 172, and to in turn provide estimated signals $\hat{s}_1$ and $\hat{s}_2$ as signals 106a and 108a to second PIC circuitry stage 300b. Second PIC circuitry stage 300b is coupled to receive received data signal 104 and respective signals 106a and 106b, and to in turn provide estimated signals $\hat{s}_1$ and $\hat{s}_2$ as signals 106b and 108b to one or more additional PIC circuitry stages, with the last PIC circuitry stage being represented in FIG. 4 by final PIC circuitry stage 300n. Final PIC circuitry stage 300n provides final estimates of signals $\hat{s}_1$ and $\hat{s}_2$ as signals 106n and 108n.

It will be understood that FIG. 4 illustrates just one exemplary embodiment of signal separation circuitry 112 having three or more PIC circuitry stages. In this regard, it will be understood that signal separation circuitry may be implemented in other embodiments to have a single PIC circuitry stage or to have two PIC circuitry stages. In the practice of the disclosed methods and systems, any given number of PIC circuitry stages may be employed as needed or desired to fit the requirements of a particular cochannel FM signal environment. In one exemplary embodiment, a desired number of PIC stages may be determined empirically by testing signal separation circuitry with different numbers of PIC circuitry stages to determine optimum performance.

Furthermore, it will be understood that FIGS. 1-4 illustrate exemplary embodiments of signal separation circuitry configured for estimation of two cochannel FM signals $\hat{s}_1$ and $\hat{s}_2$. In this regard, signal separation circuitry may be configured to process and separate three or more cochannel FM signals. For example, in one embodiment, initial signal estimation circuitry may be provided in the form of SIC circuitry that is configured to handle an additional cochannel FM signal $\hat{s}_3$. This may be done by adding a second summer to second SIC stage 260 which subtracts second signal $\hat{s}_2$ from received data 104 and by supplying the resulting signal from the summer to a third SIC stage (e.g., configured similar to first and second SIC stages 250 and 260) which produces an estimate of third signal $\hat{s}_3$ in a similar manner as first and second signals $\hat{s}_1$ and $\hat{s}_2$. A similarly methodology may be applied to configure SIC circuitry with additional stages to handle four or more cochannel FM signals.

Similarly, PIC circuitry may be configured to handle three or more cochannel signals. For example, an additional cochannel FM signal $\hat{s}_3$ may be handled by providing an estimate of third signal $\hat{s}_3$ from initial signal estimation circuitry (e.g., SIC circuitry) to a third summer provided in the interference cancellation circuit block of the PIC circuitry (e.g., interference cancellation block 310 of PIC circuitry 300), and by coupling the output of the third summer to a third single signal estimation path provided within the signal estimation circuit block of PIC circuitry (e.g., signal estimation circuit block 320 of PIC circuitry 300). A similarly methodology may be applied to configure PIC circuitry with additional signal paths to handle four or more cochannel FM signals.

Figure 5:
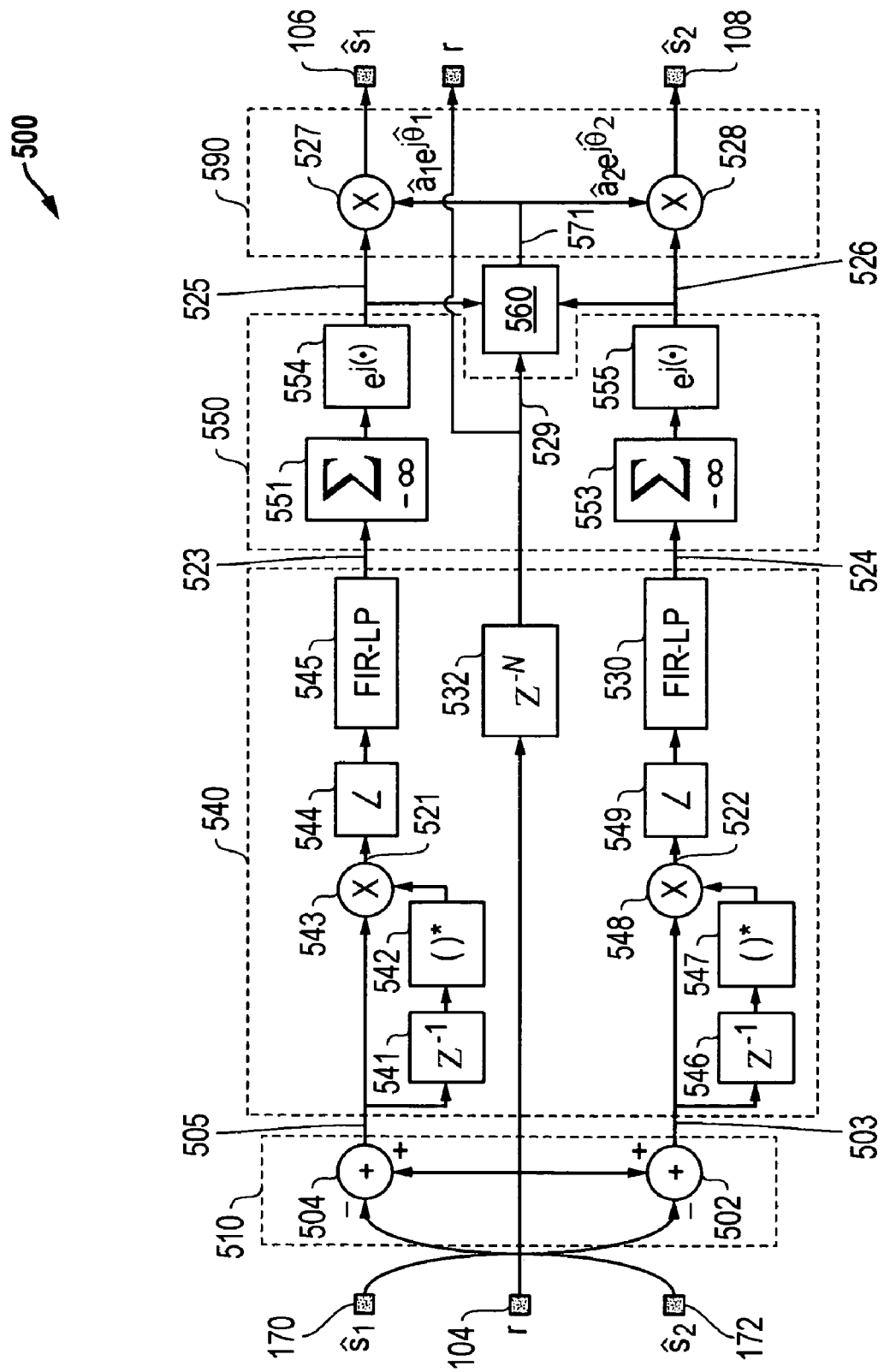
FIG. 5 is a block diagram of parallel interference cancellation circuitry according to one exemplary embodiment of the disclosed methods and systems.

Exemplary PIC circuitry 300 of FIG. 3 has been described above as it may implemented in a block-mode implementation. FIG. 5 illustrates one exemplary embodiment of the disclosed methods and systems as it may be implemented to employ a streaming implementation of PIC circuitry 300. In this regard, a streaming implementation of PIC circuitry 300 may be substituted for a block mode PIC circuitry 300 in signal separation circuitry 112 of FIGS. 1A, 1B and 4. A streaming implementation of PIC circuitry may be desirable to reduce or substantially eliminate errors that may occur at block boundaries or endpoints, e.g., due to Fast Fourier Transform ("FFT") filtering during demodulation. Such a streaming implementation may be configured to operate in a continuous manner on a sample-by-sample basis, including FM demodulation and signal reconstruction tasks. In such an implementation, amplitude and phase estimation is performed on a continuous basis, instead of updating once per block. Because filtering is done in the demodulation continuously, block boundary problems are reduced or substantially avoided. Furthermore, amplitude and phase estimation tasks are updated for each sample to allow continuous tracking, e.g., using a recursive least squares ("RLS") procedure rather than a block least squares approach that derives an estimate on a first block of data, and then repeats this for each new block.

As described above, FIG. 5 shows an alternate embodiment of PIC circuitry 300 configured to operate in streaming mode. In this alternate embodiment, PIC circuitry 300 has an interference cancellation circuit block 510 that includes summers 502 and 504 for subtracting or at least partially canceling previously estimated signals $\hat{s}_1$ and $\hat{s}_2$ from received data signal 104. In this regard, interference cancellation circuit block 510 functions similar to interference cancellation circuit block 310 of FIG. 3 to produce weighted signals 503 and 505, respectively, that are each weighted toward the remaining (non-subtracted) signal, i.e., signal 503 is weighted toward signal $\hat{s}_2$ and signal 505 is weighted toward signal $\hat{s}_1$.

Still referring to streaming PIC circuitry stage 300 of FIG. 5, each of signals 503 and 505 are then provided to a respective single signal estimation path of a signal estimation circuit that passes through signal demodulator circuit block 540, signal modulator circuit block 550, phase and amplitude estimation circuit block 560, and mixer circuit block 590. As described below, weighted signal 503 is used by signal estimation circuitry of FIG. 5 to produce a new estimate of signal $\hat{s}_2$, and weighted signal 505 is used by signal estimation circuitry of FIG. 5 to produce a new estimate of $\hat{s}_1$.

As previously mentioned, each single signal estimation path of signal estimation circuitry of FIG. 5 passes through signal demodulator circuit block 540 and signal modulator circuit block 550. As described below, signal demodulator circuit block 540 and signal modulator circuit block 550 together are configured to receive signal 505, to estimate the strongest signal $\hat{s}_1$ present in signal 505, and to output this estimate as signal 525. Similarly, signal demodulator circuit block 540 and signal modulator circuit block 550 together are configured to receive signal 503, to estimate the strongest signal $\hat{s}_2$ present in signal 503, and to output this estimate as signal 526.

Still referring to FIG. 5, signal demodulator circuit block 540 of streaming mode PIC circuitry 300 includes delay blocks 541 and 546, complex conjugate blocks 542 and 547, and mixer blocks 543 and 548 that coupled together in the manner shown to estimate frequency of respective signal $\hat{s}_1$ or $\hat{s}_2$. In the illustrated configuration of these components, the delayed phase of each of signals 505 and 503 at a previous time is subtracted from the undelayed phase of respective signal 505 or 503 by delaying each signal in it respective delay block 541 or 546, performing a complex conjugate on the delayed signal in its respective conjugate block 542 or 547, and then mixing or multiplying the result with the undelayed signal in its respective mixer block 543 and 548 to produce signals 521 and 522 that represent an estimate of the frequency of signals $\hat{s}_1$ and $\hat{s}_2$, respectively.

As shown, signal demodulator circuit block 540 also includes angle extraction blocks 544 and 549 in which the angle of the phase difference between the delayed and undelayed signal is extracted from signals 521 and 522, respectively. Each of the resulting signals is then passed through a finite impulse response low pass (FIR-LP) filter 545 or 530 to produce a corresponding signal 523 or 524 that is provided to signal modulator circuit block 550 in the manner shown. In the illustrated exemplary embodiment of FIG. 5, signal modulator circuit block 550 includes summation blocks 551 and 555, and processing blocks 554 and 555, in which respective signals 523 and 524 are processed to produce estimated signals 525 and 526.

As configured in the above-described embodiment, blocks 541, 542, 543, 544 and 545 constitute a first discrete-time FM demodulator, and blocks 551 and 554 constitute a first discrete-time FM modulator. Similarly, blocks 546, 547, 548, 549 and 530 constitute a second discrete-time FM demodulator, and blocks 553 and 555 constitute a second discrete-time FM modulator. Signals 523 and 524 are the respective first and second demodulated messages, and signals 525 and 526 are the respective first and second re-modulated signals.

As shown in FIG. 5, phase and amplitude estimation circuit block 560 is configured to receive received data signal 104 that has been processed by delay block 541 for the purpose of time alignment. Phase and amplitude estimation circuit block 560 is also configured to receive signal 525 and 526. Phase and amplitude estimation circuit block 560 is configured to estimate phase and amplitude of signals $\hat{s}_1$ and $\hat{s}_2$, and to output this estimate of phase and amplitude as a remodulated signal 571. As shown, remodulated signal 571 is multiplied with signal 525 in mixer circuitry 527 to provide estimated signal $\hat{s}_1$ as signal 106 (having corrected phase and amplitude), and remodulated signal 571 is multiplied with signal 526 in mixer circuitry 528 to provide estimated signal $\hat{s}_2$ as signal 108 (having corrected phase and amplitude). In FIG. 5, each of signals 106 and 108 represent improved estimated signals $\hat{s}_1$ and $\hat{s}_2$ that are corrected for phase and amplitude, and in one embodiment, suitable for use by the next PIC cancellation stage (where present). In this regard, phase and amplitude estimation circuitry 560 may be implemented using any algorithm or methodology suitable for continuously estimating phase and amplitude of transmitted signals $\hat{s}_1$ and $\hat{s}_2$ on a sample by sample basis including, for example, recursive least squares algorithm, etc.

In the practice of one embodiment of the disclosed systems and methods, signal reconstruction (re-modulation circuit block) of PIC circuitry may be used to generate an ideal FM signal, with co modulus, i.e., matching what is believed that the FM signal looked like at the transmitting antenna. In one exemplary embodiment, an adaptive filter may be employed in the signal reconstruction (re-modulation circuit block) to model and reduce channel effects caused by filtering introduced in the channel of the RF front end in order to produce an ideal waveform that more closely matches the received signal where there is a significant amount of filtering. This may be desirable because even slight errors in signal reconstruction and cancellation may lead to an inability to extract weaker signals.

Referring again to FIG. 5, phase and amplitude estimation circuit block 560 may be implemented in one embodiment using RLS algorithm in the manner of an adaptive filter with only a single tap. This single complex tap may be employed to adjust amplitude and phase. In another embodiment, phase and amplitude estimation circuit block 560 may be modified to allow this structure to be generalized to an adaptive FIR filter with multiple taps. In this regard, each of signals 525 and 526 output from signal modulator circuit block 550 may be treated as an auxiliary sensor located at the transmitter, and the digital tuner output 529 treated as a primary sensor. In this embodiment, the adaptive filter may be employed to estimate the channel relating these two sensors, to allow for accurate cancellation at the primary sensor output. In yet another exemplary embodiment, an adaptive equalizer may be included in signal demodulator circuit block 540. A blind adaptive technique may be employed, e.g., constant modulus algorithm (CMA), for the constant modulus signals of this case.

FIG. 5 illustrates a single layer or stage of streaming PIC circuitry 300 as it may be configured in a two-signal case to receive estimated FM signals $\hat{s}_1$ and $\hat{s}_2$ as signals 170 and 172, respectively, from initial signal estimation circuitry 200 (e.g., which may be SIC circuitry in one embodiment). Although streaming PIC circuitry 300 of FIG. 5 is shown coupled to receive estimated FM signals $\hat{s}_1$ and $\hat{s}_2$ as signals 170 and 172, it will be understood that streaming PIC circuitry 300 may alternatively be configured as an intermediate or final stage of multiple stage PIC circuitry, in which case PIC circuitry 300 may be coupled to receive estimated FM signals $\hat{s}_1$ and $\hat{s}_2$ as signals 106 and 108 from a previous stage of PIC circuitry as described further herein in relation to FIG. 4.

Furthermore, streaming PIC circuitry may be configured to handle three or more cochannel signals. For example, an additional cochannel FM signal $\hat{s}_3$ may be handled by providing an estimate of third signal $\hat{s}_3$ from initial signal estimation circuitry (e.g., SIC circuitry) to a third summer provided in the interference cancellation circuit block of streaming PIC circuitry (e.g., interference cancellation block 510 of streaming PIC circuitry 300 of FIG. 5), and by coupling the output of the third summer to a third signal estimation path of a signal estimation circuit (e.g., signal estimation path passing through signal demodulator circuit block 540, signal modulator circuit block 550, phase and amplitude estimation circuit block 560, and mixer circuit block 590). A similarly methodology may be applied to configure PIC circuitry with additional signal paths to handle four or more cochannel FM signals.

Although FIG. 5 illustrates one exemplary embodiment of streaming PIC circuitry having interference cancellation circuit block 510 and a signal estimation circuit that passes through signal demodulator circuit block 540, signal modulator circuit block 550, phase and amplitude estimation circuit block 560 and mixer circuit block 590, it will be understood that any other circuit configuration suitable for estimating or further refining estimates of multiple cochannel signals (e.g., signals $\hat{s}_1$ and $\hat{s}_2$) by estimating each signal independently on a streaming basis may be employed. In this regard, a streaming signal estimation circuit may be any circuit configuration suitable for producing two or more processed signals that are each weighted toward one of the cochannel signals (e.g., signal $\hat{s}_1$ or $\hat{s}_2$) present in received data, then estimating the strongest signal (e.g., signal $\hat{s}_1$ or $\hat{s}_2$) present in each of the two or more processed signals, and then correcting the phase and amplitude of each of the strongest signals (e.g., signal $\hat{s}_1$ and $\hat{s}_2$) to produce an improved estimate of each of the cochannel signals (e.g., signal $\hat{s}_1$ and $\hat{s}_2$).

The disclosed systems and methods may be implemented using signal separation circuitry having a number of signal paths that is greater than or equal to the number of cochannel signals present in an overloaded signal environment, and in one embodiment using signal separation circuitry having a number of signal paths that is equal to the number of cochannel signals present in an overloaded signal environment. It is also possible in one exemplary embodiment to configure signal separation circuitry (e.g., including SIC and block mode or streaming PIC circuitry) with an adaptable number of signal paths. In such a case, additional signal paths may be activated to match the number of cochannel signals detected to be present (e.g., by a signal activity detector) in an overloaded signal environment. For example, signal separation circuitry may be configured with three or more signal paths, and then operated so that only two of the signal paths are active to separate two sensed signals $\hat{s}_1$ and $\hat{s}_2$, three signal paths are active to separate three sensed signals $\hat{s}_1$, $\hat{s}_2$, and $\hat{s}_3$, etc. Such an adaptive scheme may be implemented manually or automatically, e.g., in response to control signals supplied by signal activity detector.

In one exemplary embodiment, the disclosed systems and methods may be implemented for separation of cochannel commercial FM broadcast signals (e.g., commercial network radio broadcast signals received by an automobile FM radio tuner) using a signal generation model that includes pilot, stereo sum and difference channels. However, the disclosed systems and methods may be alternatively implemented to process a wide variety of other types of FM signals and/or FM signals received in a wide variety of different signal environments.

Although previously described herein in relation to processing of single-channel received RF data, it will be understood that the disclosed systems and methods may alternatively be implemented in one exemplary embodiment to process multiple channels of received RF data. For example, the embodiment of FIG. 3 may be modified to process multiple two-signal channels of received data by modifying the configuration of block 340 to estimate the amplitude and phase of both signals for each channel of data. Thus, assuming N channels of received data, N amplitude estimates and N phase estimates may be generated, i.e., one per channel. These amplitude estimates and phase estimates may be used to reconstruct the sum of the two signals present on each channel, and this reconstruction then cancelled from the received data. In this regard, the canceller of block 310 may be modified to cancel on all N channels, instead of on just one channel. In addition, the demodulation circuit blocks 322 and 326 may be modified to make use of all N channels of cancelled data, for example, by coherent combining as is employed in some types of beamforming.

EXAMPLES

Multichannel data was collected from two cochannel FM emitters. The two cochannel included one relatively strong cochannel signal (S1) and one relatively weak cochannel signal (S2), although it will be understood that the disclosed methods and systems may be implemented in overloaded signal environments having two or more FM cochannel signals of equivalent strength.

For comparison, the multichannel data was processed with a conventional blind adaptive beamforming algorithm to provide estimates of the two signals present in the data. The beamformer outputs are presented in the FIGS. 6-11 as curves having long dashes. The multichannel data was also processed using components of signal separation circuitry of the disclosed systems and methods. The outputs of the signal separation circuitry are presented in the FIGS. 6-11 as curves having short dashes. Each of FIGS. 6-11 is a plot of detected audio voltage versus time.

Figure 6:
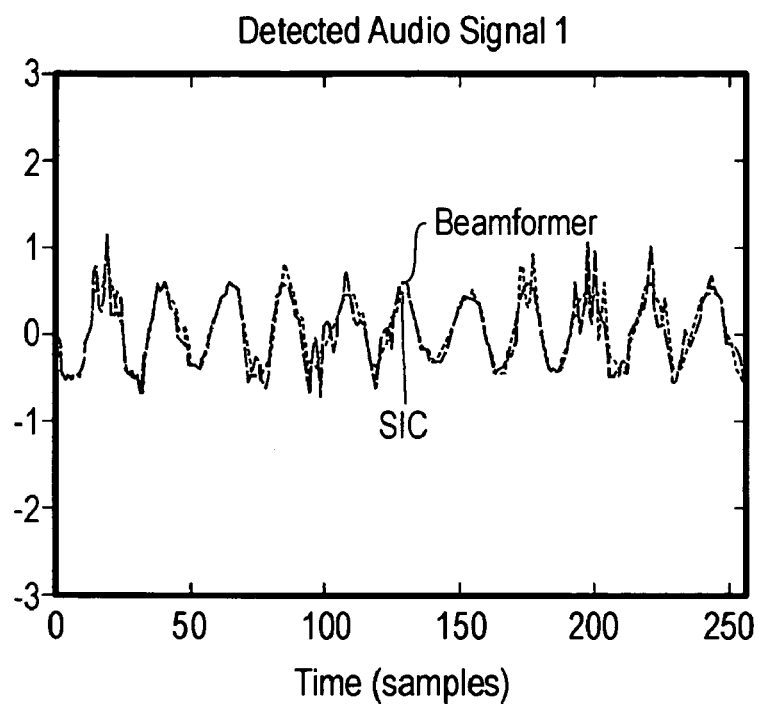
FIG. 6 is a is a plot of detected audio voltage versus time.
Figure 7:
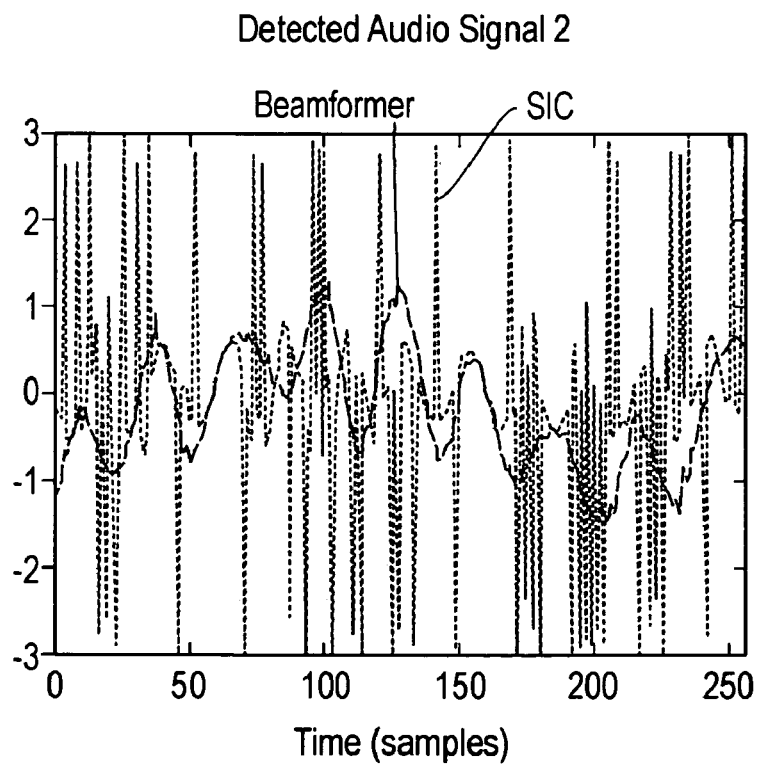
FIG. 7 is a is a plot of detected audio voltage versus time.

FIG. 6 shows the performance after serial initialization processing only (i.e., by SIC circuitry) for the stronger signal. No processing by any layers of PIC circuitry has occurred at this point, and the stronger signal is copied fairly cleanly, illustrating the capture effect of FM. FIG. 7 shows the performance of the weaker signal after serial initialization processing only. From the poor agreement between the beamformer (curve with long dashes) and single-channel processing (curve with short dashes) it may be seen that copy for the weaker signal is very poor after only the serial initialization processing.

Figure 8:
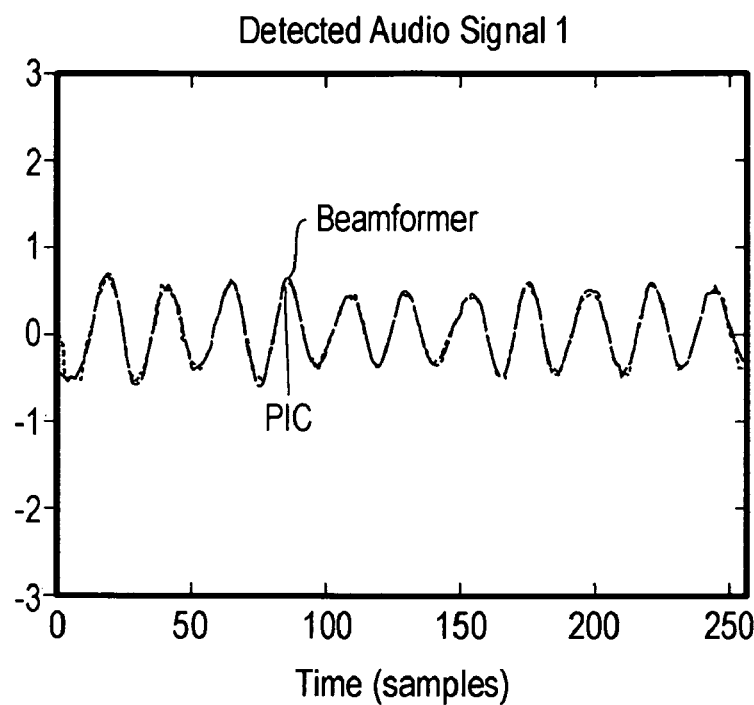
FIG. 8 is a is a plot of detected audio voltage versus time.
Figure 9:
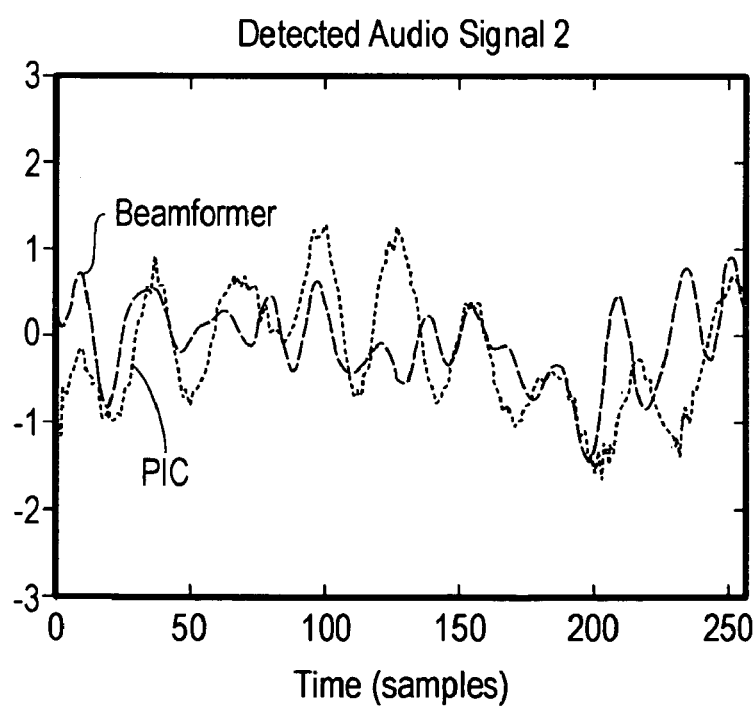
FIG. 9 is a is a plot of detected audio voltage versus time.
Figure 10:
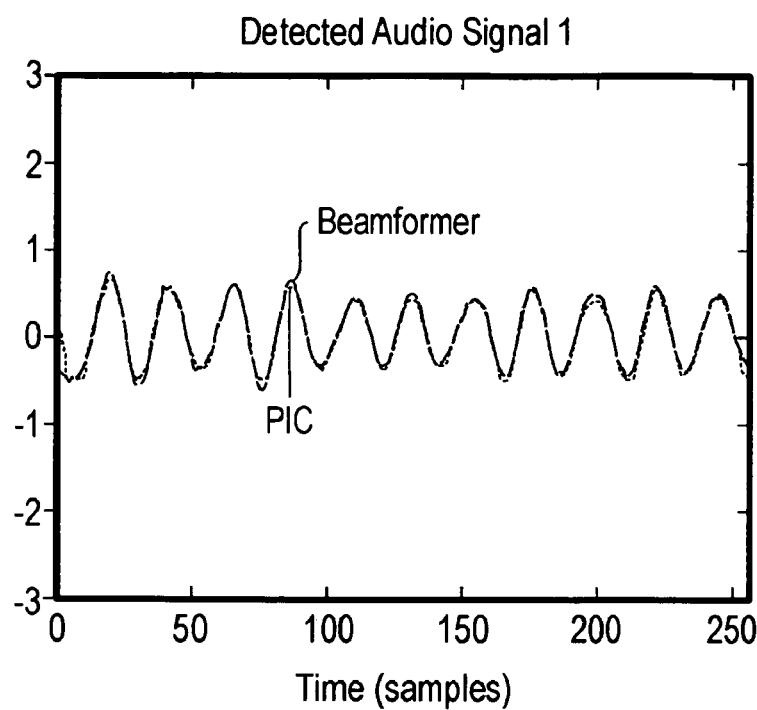
FIG. 10 is a is a plot of detected audio voltage versus time.
Figure 11:
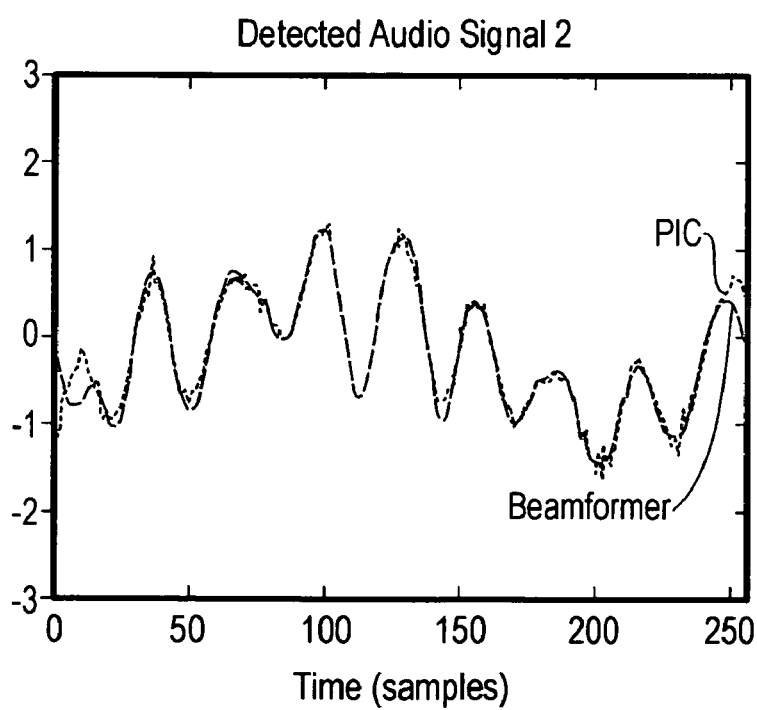
FIG. 11 is a is a plot of detected audio voltage versus time.

FIG. 8 shows the performance of the stronger signal after a single layer of block mode PIC processing (i.e., after one layer of PIC processing). The stronger signal has essentially converged to the same solution produced by the beamformer at this point. The weaker signal has begun to converge, as FIG. 9 indicates. The performance of both signals after a second layer of block PIC processing (i.e., after two layers of PIC processing) is shown in FIGS. 10 and 11. As may be seen, both signals have converged well at this stage in the processing.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method for processing FM signals, comprising:
   receiving RF data, said received RF data comprising cochannel FM signals received in the same frequency range and at the same time;
   using parallel interference cancellation to provide an estimate for each of said cochannel FM signals; and
   separating each of said cochannel FM signals from other cochannel FM signals of said received RF data based on said estimate for each of said cochannel FM signals;
   wherein said RF data is received in an overloaded signal environment;
   wherein said received RF data comprises at least first and second cochannel FM signals received in the same frequency range and at the same time; and
   wherein said method further comprises:
      providing an initial estimate for each of said first and second cochannel FM signals,
      subtracting said initial estimate for said first co channel FM signal from said received data to produce a signal weighted toward said second cochannel FM signal,
      subtracting said initial estimate for said second co channel FM signal from said received data to produce a signal weighted toward said first cochannel FM signal,
      demodulating and remodulating said signal weighted toward said second cochannel FM signal to produce an improved estimate of said second cochannel FM signal,
      demodulating and remodulating said signal weighted toward said first cochannel FM signal to produce an improved estimate of said first cochannel FM signal,
      estimating the phase and amplitude of each of said first and second cochannel FM signals,
      correcting phase and amplitude of said improved estimate of said second cochannel FM signal using said estimated phase and amplitude of said second cochannel FM signal, and
      correcting phase and amplitude of said improved estimate of said first cochannel FM signal using said estimated phase and amplitude of said first cochannel FM signal.

2. The method of claim 1, wherein said RF data comprises a single channel of data.

3. The method of claim 1, wherein said method comprises:
providing an initial estimate for each of said cochannel FM signals; and
using parallel interference cancellation to provide at least one first improved estimate for each of said cochannel FM signals based at least in part on said initial estimates for each of said cochannel FM signals and said received RF data.

4. The method of claim 3, wherein said method comprises: using parallel interference cancellation to provide a second improved estimate for each of said cochannel FM signals based at least in part on said first improved estimates for each of said cochannel FM signals and said received RF data.

5. The method of claim 3, wherein said method comprises using serial interference cancellation (SIC) to provide said initial estimate for each of said cochannel FM signals.

6. The method of claim 1, wherein said parallel interference cancellation is performed on a data block by data block basis.

7. The method of claim 1, wherein said parallel interference cancellation is performed on a streaming basis.

8. The method of claim 1, wherein said overloaded signal environment is created by intentionally broadcasting said cochannel FM signals simultaneously in the same frequency range.

9. The method of claim 8, wherein one of said cochannel FM signals comprises public service information; and wherein said method further comprises isolating said FM signal comprising said public service information from other cochannel FM signals of said received RF data.

10. The method of claim 8, wherein said method further comprises selectively isolating a given one of said cochannel FM signals from other cochannel FM signals of said received RF data in response to a command specifying the identity of said given one of said cochannel FM signals.

11. A method for transmitting FM signals, comprising providing RF data comprising cochannel FM signals for transmission in the same frequency range and at the same time for reception by a receiver, said receiver configured to separate each of said cochannel FM signals from other cochannel FM signals of said RF data based on an estimate for each of said cochannel FM signals provided by parallel interference cancellation; wherein said receiver is operating in an overloaded signal environment; wherein one of said cochannel FM signals comprises public service information; and wherein said receiver is further configured to isolate said FM signal comprising said public service information from other cochannel FM signals of said received RF data.

12. The method of claim 11, wherein said receiver is further configured to selectively isolate a given one of said cochannel FM signals from other cochannel FM signals of said received RF data in response to a command specifying the identity of said given one of said cochannel FM signals.

13. The method of claim 11, wherein said method further comprises receiving said transmitted RF data comprising cochannel FM signals; and separating each of said cochannel FM signals from other cochannel FM signals of said RF data based on an estimate for each of said cochannel FM signals provided by parallel interference cancellation.

14. A system for communication, said system comprising:
transmit circuitry configured to provide RF data comprising cochannel FM signals for transmission in the same frequency range and at the same time; and
receive and separation circuitry configured to receive and separate each of said cochannel FM signals from other cochannel FM signals of said RF data by using parallel interference cancellation to provide an estimate for each of said cochannel FM signals, and separating each of said cochannel FM signals from other cochannel FM signals of said received RF data based on said estimate for each of said cochannel FM signals;
wherein said receive and separation circuitry is coupled to receive RF data from at least one sensor operating in an overloaded signal environment;
wherein said received RF data comprises at least first and second cochannel FM signals received in the same frequency range and at the same time; and
wherein said receive and separation circuitry is configured to:
provide an initial estimate for each of said first and second cochannel FM signals,
subtract said initial estimate for said first co channel FM signal from said received data to produce a signal weighted toward said second cochannel FM signal,
subtract said initial estimate for said second co channel FM signal from said received data to produce a signal weighted toward said first cochannel FM signal,
demodulate and remodulate said signal weighted toward said second cochannel FM signal to produce an improved estimate of said second cochannel FM signal,
demodulate and remodulate said signal weighted toward said first cochannel FM signal to produce an improved estimate of said first cochannel FM signal,
estimate the phase and amplitude of each of said first and second cochannel FM signals,
correct phase and amplitude of said improved estimate of said second cochannel FM signal using said estimated phase and amplitude of said second cochannel FM signal, and
correct phase and amplitude of said improved estimate of said first cochannel FM signal using said estimated phase and amplitude of said first cochannel FM signal.

15. An FM signal processing system, comprising:
receive and separation circuitry coupled to receive RF data, said received RF data comprising cochannel FM signals received in the same frequency range and at the same time; and
wherein said receive and separation circuitry is configured to use parallel interference cancellation to provide an estimate for each of said cochannel FM signals, and to separate each of said cochannel FM signals from other cochannel FM signals of said received RF data based on said estimate for each of said cochannel FM signals;
wherein said receive and separation circuitry is coupled to receive RF data from at least one sensor operating in an overloaded signal environment;
wherein said received RF data comprises at least first and second cochannel FM signals received in the same frequency range and at the same time; and
wherein said receive and separation circuitry is configured to:
provide an initial estimate for each of said first and second cochannel FM signals,
subtract said initial estimate for said first co channel FM signal from said received data to produce a signal weighted toward said second cochannel FM signal,
subtract said initial estimate for said second co channel FM signal from said received data to produce a signal weighted toward said first cochannel FM signal,
demodulate and remodulate said signal weighted toward said second cochannel FM signal to produce an improved estimate of said second cochannel FM signal, demodulate and remodulate said signal weighted toward said first cochannel FM signal to produce an improved estimate of said first cochannel FM signal, estimate the phase and amplitude of each of said first and second cochannel FM signals, correct phase and amplitude of said improved estimate of said second cochannel FM signal using said estimated phase and amplitude of said second cochannel FM signal, and correct phase and amplitude of said improved estimate of said first cochannel FM signal using said estimated phase and amplitude of said first cochannel FM signal.

16. The system of claim 15, wherein said receive and separation circuitry is coupled to receive RF data from a single sensor operating in an overloaded signal environment.

17. The system of claim 15, wherein said receive and separation circuitry is configured to separate each of said cochannel FM signals from said other cochannel FM signals by:

providing an initial estimate for each of said cochannel FM signals; and using parallel interference cancellation to provide at least one first improved estimate for each of said cochannel FM signals based at least in part on said initial estimates for each of said cochannel FM signals and said received RF data.

18. The system of claim 17, wherein said receive and separation circuitry is configured to use parallel interference cancellation to provide a second improved estimate for each of said cochannel FM signals based at least in part on said first improved estimates for each of said cochannel FM signals and said received RF data.

19. The system of claim 17, wherein one of said cochannel FM signals comprises public service information; and wherein said receive and separation circuitry is further configured to isolate said FM signal comprising said public service information from other cochannel FM signals of said received RF data.

20. The system of claim 17, wherein said receive and separation circuitry is further configured to selectively isolate a given one of said cochannel FM signals from other cochannel FM signals of said received RF data in response to a command specifying the identity of said given one of said cochannel FM signals.

21. The system of claim 15, wherein said receive and separation circuitry is configured to perform said parallel interference cancellation on a data block by data block basis.

22. The system of claim 15, wherein said receive and separation circuitry is configured to perform said parallel interference cancellation on a streaming basis.

23. The system of claim 15, wherein said receive and separation circuitry is configured to use serial interference cancellation (SIC) to provide said initial estimate for each of said cochannel FM signals.

24. Signal separation circuitry configured to be coupled to a source of received RF data that includes cochannel FM signals, said signal separation circuitry comprising a first stage of parallel interference cancellation (PIC) circuitry;

wherein said received RF data comprises at least first and second cochannel FM signals received in the same frequency range and at the same time; and wherein said signal separation circuitry is configured to:

provide an initial estimate for each of said first and second cochannel FM signals, subtract said initial estimate for said first co channel FM signal from said received data to produce a signal weighted toward said second cochannel FM signal, subtract said initial estimate for said second co channel FM signal from said received data to produce a signal weighted toward said first cochannel FM signal, demodulate and remodulate said signal weighted toward said second cochannel FM signal to produce an improved estimate of said second cochannel FM signal, demodulate and remodulate said signal weighted toward said first cochannel FM signal to produce an improved estimate of said first cochannel FM signal, estimate the phase and amplitude of each of said first and second cochannel FM signals, correct phase and amplitude of said improved estimate of said second cochannel FM signal using said estimated phase and amplitude of said second cochannel FM signal, and correct phase and amplitude of said improved estimate of said first cochannel FM signal using said estimated phase and amplitude of said first cochannel FM signal.

25. The signal separation circuitry of claim 24, further comprising initial signal estimation circuitry coupled to said first stage of PIC circuitry; wherein said initial signal estimation circuitry is configured to be coupled between said source of received RF data and said PIC circuitry.

26. The signal separation circuitry of claim 25, wherein said initial signal estimation circuitry comprises serial interference cancellation (SIC) circuitry.

27. The signal separation circuitry of claim 25, further comprising a second stage of PIC circuitry coupled to said first stage of PIC circuitry.

28. A method for processing FM signals, comprising:

receiving RF data, said received RF data comprising cochannel FM signals received in the same frequency range and at the same time;

using parallel interference cancellation to provide an estimate for each of said cochannel FM signals; and separating each of said cochannel FM signals from other cochannel FM signals of said received RF data based on said estimate for each of said cochannel FM signals;

wherein said RF data is received in an overloaded signal environment;

wherein said overloaded signal environment is created by intentionally broadcasting said cochannel FM signals simultaneously in the same frequency range;

wherein one of said cochannel FM signals comprises public service information; and wherein said method further comprises isolating said FM signal comprising said public service information from other cochannel FM signals of said received RF data.

29. A method for processing FM signals, comprising:

receiving RF data, said received RF data comprising cochannel FM signals received in the same frequency range and at the same time;

using parallel interference cancellation to provide an estimate for each of said cochannel FM signals; and separating each of said cochannel FM signals from other cochannel FM signals of said received RF data based on said estimate for each of said cochannel FM signals;

wherein said RF data is received in an overloaded signal environment;

wherein said overloaded signal environment is created by intentionally broadcasting said cochannel FM signals simultaneously in the same frequency range; and wherein said method further comprises selectively isolating a given one of said cochannel FM signals from other cochannel FM signals of said received RF data in response to a command specifying the identity of said given one of said cochannel FM signals.

30. An FM signal processing system, comprising:
receive and separation circuitry coupled to receive RF data, said received RE data comprising cochannel FM signals received in the same frequency range and at the same time; and
wherein said receive and separation circuitry is configured to use parallel interference cancellation to provide an estimate for each of said cochannel FM signals, and to separate each of said cochannel FM signals from other cochannel FM signals of said received RF data based on said estimate for each of said cochannel FM signals;
wherein said receive and separation circuitry is coupled to receive RF data from at least one sensor operating in an overloaded signal environment;
wherein one of said cochannel FM signals comprises public service information; and
wherein said receive and separation circuitry is further configured to isolate said FM signal comprising said public service information from other cochannel FM signals of said received RF data.

31. An FM signal processing system, comprising:
receive and separation circuitry coupled to receive RF data, said received RF data comprising cochannel FM signals received in the same frequency range and at the same time; and
wherein said receive and separation circuitry is configured to use parallel interference cancellation to provide an estimate for each of said cochannel FM signals, and to separate each of said cochannel FM signals from other cochannel FM signals of said received RF data based on said estimate for each of said cochannel FM signals;
wherein said receive and separation circuitry is coupled to receive RF data from at least one sensor operating in an overloaded signal environment; and
wherein said receive and separation circuitry is further configured to selectively isolate a given one of said cochannel FM signals from other cochannel FM signals of said received RF data in response to a command specifying the identity of said given one of said cochannel FM signals.

* * * * *

UNITED STATES PATENT AND TRADEMARK OFFICE
CERTIFICATE OF CORRECTION

PATENT NO. : 7,426,378 B2 Page 1 of 1
APPLICATION NO. : 11/099229
DATED : September 16, 2008
INVENTOR(S) : Stanners It is certified that error appears in the above-identified patent and that said Letters Patent is hereby corrected as shown below:

In claim 30, column 21, line 8, delete "RE," and insert --RF--.

Signed and Sealed this

Eighteenth Day of November, 2008

JON W. DUDAS
*Director of the United States Patent and Trademark Office*